United States Patent [19]
Balsdon et al.

[11] Patent Number: 5,909,725
[45] Date of Patent: Jun. 8, 1999

[54] AUTOMOTIVE EMISSION CONTROL VALVE RETAINING CLIP AND MOUNTING METHOD

[75] Inventors: David W. Balsdon; Murray F. Busato, both of Chatham, Canada

[73] Assignee: Siemens Canada Limited, Chatham, Canada

[21] Appl. No.: 09/044,524

[22] Filed: Mar. 19, 1998

Related U.S. Application Data

[60] Provisional application No. 60/058,674, Sep. 12, 1997.

[51] Int. Cl.[6] .................... F02M 37/04; F02B 47/08
[52] U.S. Cl. ................ 123/516; 123/568.11; 123/470
[58] Field of Search ...................... 123/516, 518, 123/519, 520, 470, 568.11, 568.17, 568.21, 568.26; 137/351, 315; 411/353, 517

[56] References Cited

U.S. PATENT DOCUMENTS

| | | | |
|---|---|---|---|
| 3,103,231 | 9/1963 | Moen | 137/625.4 |
| 3,570,537 | 3/1971 | Kelly | 137/625.15 |
| 4,004,684 | 1/1977 | Scollins | 220/319 |
| 4,109,672 | 8/1978 | Szemeredi | 137/315 |
| 4,475,516 | 10/1984 | Atkins et al. | 123/470 |
| 4,984,548 | 1/1991 | Hudson, Jr. | 123/470 |
| 5,058,554 | 10/1991 | Takeda et al. | 123/456 |
| 5,167,213 | 12/1992 | Bassler et al. | 123/470 |
| 5,413,082 | 5/1995 | Cook et al. | 123/520 |
| 5,501,195 | 3/1996 | Hall | 123/468 |

*Primary Examiner*—Thomas N. Moulis

[57] ABSTRACT

An emission control valve is retained in a mounting on an engine intake manifold by a retaining clip. The clip is formed from a single piece of metal strip stock to have tines that pass through slots in the mounting to axially capture the valve in the mounting. The clip also has a locking formation releasably locking the clip with a catch formation of the mounting.

20 Claims, 4 Drawing Sheets

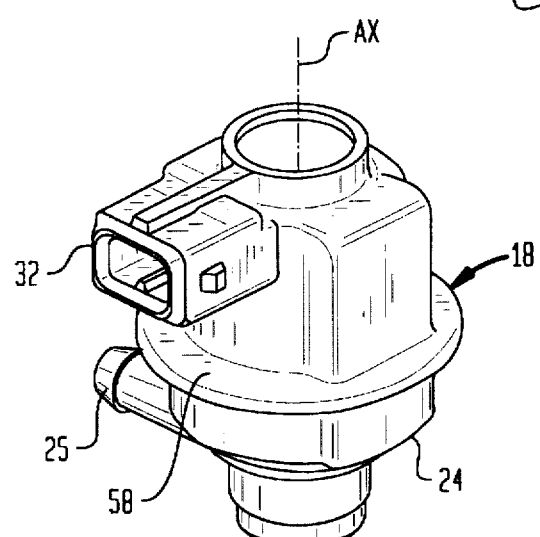
FIG. 2
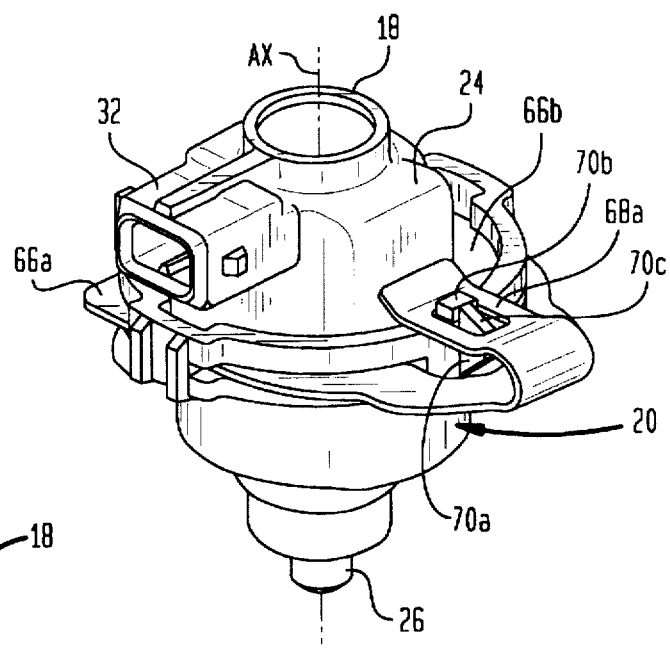
FIG. 1
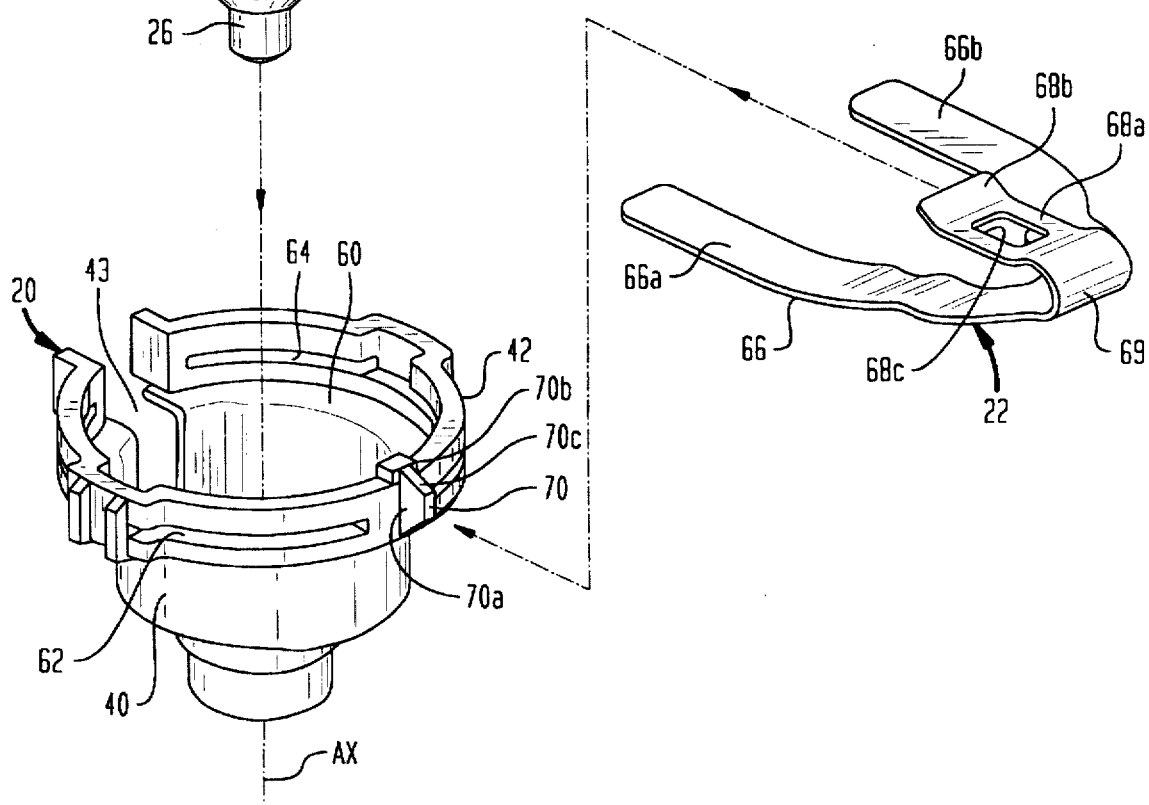

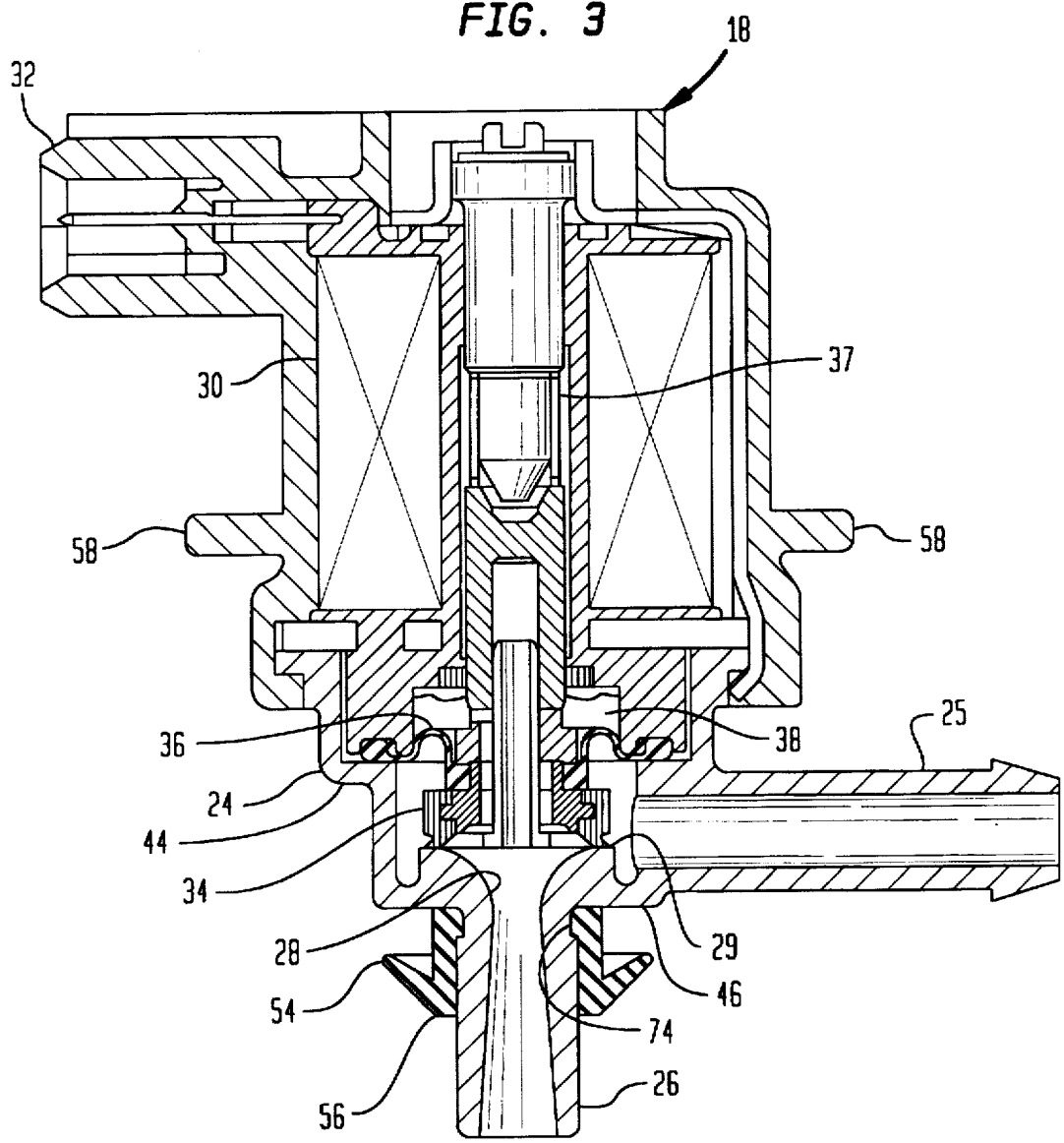

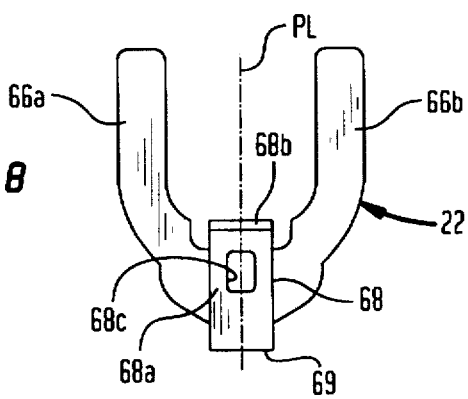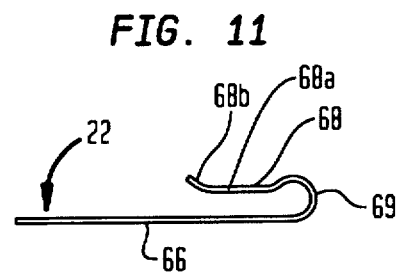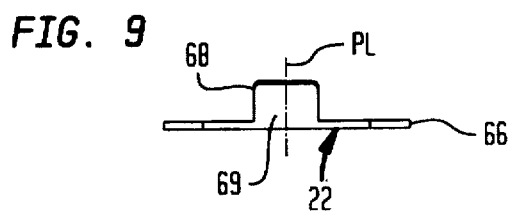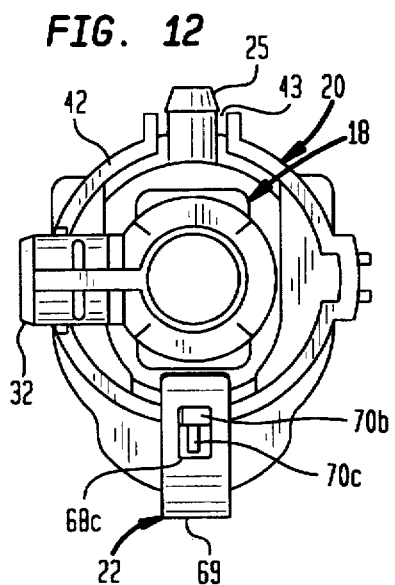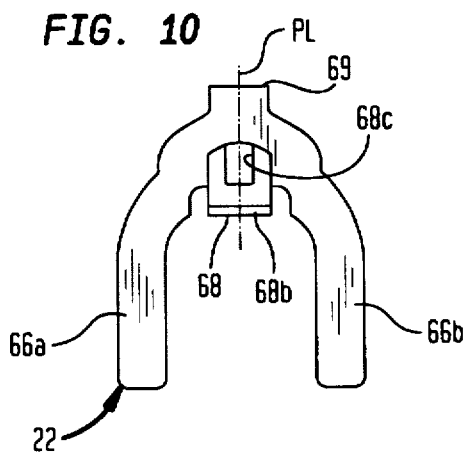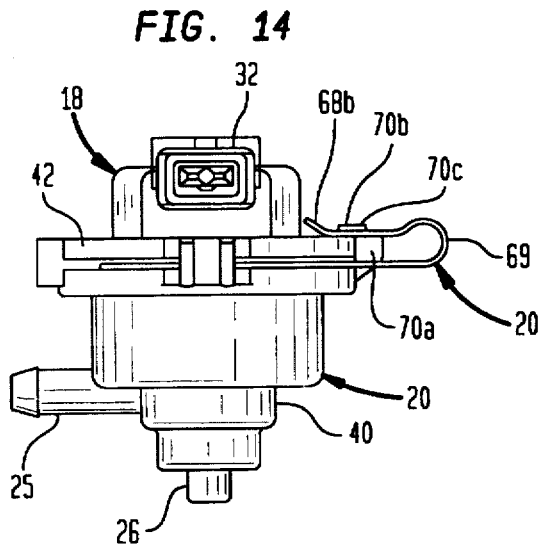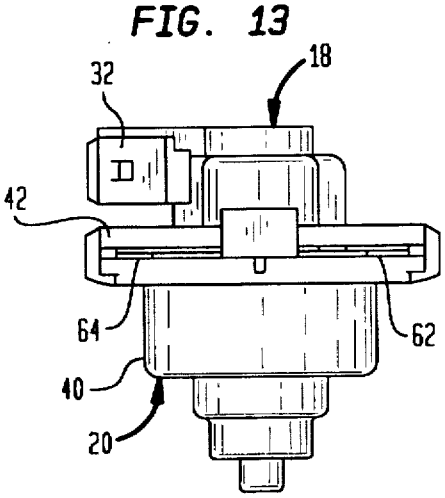

AUTOMOTIVE EMISSION CONTROL VALVE RETAINING CLIP AND MOUNTING METHOD

REFERENCE TO RELATED APPLICATION AND PRIORITY CLAIM

This application expressly claims the benefit of earlier filing date and right of priority from the following co-pending patent application: U.S. Provisional Application Ser. No. 60/058,674, (Attorney Docket 97P7703US) Filed on Sep. 12, 1997 in the names of Balsdon et al, entitled "Manifold Integrated Canister Purge Solenoid With Retaining Clip" of which provisional patent application is expressly incorporated in its entirety by reference.

INCORPORATION BY REFERENCE

The contents of pending Non-provisional U.S. patent application Ser. No. 08/918,071, filed Aug. 25, 1997, are hereby incorporated in their entirety by reference as if fully disclosed herein.

FIELD OF THE INVENTION

This invention relates generally to emission control devices for internal combustion engine powered motor vehicles, and in particular to a method employing a retaining clip for mounting an emission control valve in a socket of a non-metallic part, such as of a plastic engine intake manifold.

BACKGROUND OF THE INVENTION

Known emission control valves for internal combustion engine powered motor vehicles include, one, purge valves for purging fuel vapors from evaporative emission spaces of fuel storage systems to engine intake manifolds to entrain the fuel vapors in fresh fuel-air charges entering the engines for combustion, and two, exhaust gas recirculation (EGR) valves for recirculating hot exhaust gases from exhaust manifolds to intake manifolds for thermal doping of fresh fuel-air charges entering the engines for combustion.

Known mountings for such valves include mounting brackets that can be attached to components of automotive vehicles by fasteners such as screws. It is also known to mount EGR valves directly on engines.

Integration of such emission control valves in engine air-fuel systems is believed to offer potential advantages for both suppliers of such systems and for automobile manufacturers who purchase such systems from suppliers. By mounting a valve on an engine component, such as a purge valve on a plastic intake manifold, to create an integrated assembly at a supplier facility, integrity of a valve and its mounting can be confirmed by the supplier. Such a procedure may yield efficiencies by enabling non-compliant components and/or systems to be detected earlier in the overall manufacturing process.

Further advantages can be realized by minimizing the number of operations required to assemble a valve into an integrated air-fuel system. While conventional fastening devices, such as threaded fasteners, are readily available for securing a valve and/or valve mounting bracket on an engine component, a single fastening device that can be used to retain a valve in a mounting without the need to perform a twisting operation on the device it believed to afford certain advantages for assembly purposes. A device which can also be expediently removed and re-installed may also facilitate service procedures whenever such procedures are performed.

SUMMARY OF THE INVENTION

One aspect of the present invention relates to a method of mounting an emission control device on a component of an internal combustion engine powered automotive vehicle, the method comprising: providing an emission control device for controlling the passage of a fluid associated with operation of an internal combustion engine through the device, the device comprising a body having an imaginary axis and a flange that extends radially and circumferentially on the body; providing a component of an automotive vehicle with a mounting for the device, the mounting comprising a catch and a receptacle defining a receptacle space within which at least a portion of the body of the device is to be disposed; providing a retaining clip for engaging the mounting to retain the device in the mounting, the clip comprising a capturing formation for coacting with the receptacle to axially capture the body of the device in the receptacle space and a locking formation for releasably locking the clip with the catch; providing the receptacle with a circumferentially extending wall having a slot that extends radially through the wall and circumferentially about the axis; disposing at least a portion of the body of the device in the receptacle space; associating the retaining clip with the mounting by passing the capturing formation into, through, and out of the slot, thence across the receptacle space in overlapping relation to the flange, and thence into the slot; and releasably locking the clip to the catch to prevent disengagement of the clip from the mounting, and attendant removal of the capturing formation out of capturing relation with the body of the device, unless the locking formation is released from locking with the catch.

Another aspect of the present invention relates to a method of retaining an emission control valve in a mounting on a component of an internal combustion engine powered automotive vehicle, the valve comprising a body having an imaginary axis, a flange that extends radially and circumferentially on the body, and ports for conveying gases associated with operation of an internal combustion engine into and out of the body, the mounting comprising a receptacle defining a receptacle space within which at least a portion of the body of the valve can be disposed, the receptacle comprises a generally circumferentially extending wall having a slot that extends radially through the wall and circumferentially about the axis, the method comprising: providing a retaining clip for engaging the mounting to retain the valve in the mounting, the clip comprising a capturing formation for coacting with the receptacle to axially capture the body of the valve in the receptacle space; and associating the clip with the receptacle by passing the capturing formation into, through, and out of the slot, thence across the receptacle space in overlapping relation to the flange, and thence into the slot, and releasably locking the clip to one of the valve and the mounting to prevent the capturing formation from being extracted from the slot unless the clip is released from locking with the one of the valve and the mounting.

Still another aspect of the present invention relates to a clip for use in retaining an emission control device in a receptacle comprising: metal strip stock comprising a flat capturing formation having thickness of the strip stock disposed in an axial direction, a locking formation having thickness of the strip stock disposed in a direction that is non-perpendicular to the axial direction, and an intermediate formation joining the flat capturing formation and the locking formation to support the latter formation for resilient flexing motion relative to the former formation.

The foregoing, and other features, along with various advantages and benefits of the invention, will be seen in the ensuing description and claims which are accompanied by drawings. The drawings, which are incorporated herein and constitute part of this specification, disclose a preferred embodiment of the invention according to the best mode contemplated at this time for carrying out the invention.

BRIEF DESCRIPTION OF THE DRAWINGS

FIG. 1 is a perspective view of an automotive emission control valve and mounting in accordance with principles of the invention.

FIG. 2 is an exploded perspective view of FIG. 1.

FIG. 3 is an enlarged longitudinal cross section view through the emission control valve by itself.

FIG. 8 is a top plan view of a retaining clip for removably securing the valve in the mounting.

FIG. 9 is a front elevation view of FIG. 8.

FIG. 10 is a bottom plan view of the retaining clip.

FIG. 11 is a left side elevation view of FIG. 8.

FIG. 12 is a top plan view in the direction of arrow 12 in FIG. 1 on a reduced scale.

FIG. 13 is a front elevation view of FIG. 12.

FIG. 14 is a left side elevation view of FIG. 12.

DESCRIPTION OF THE PREFERRED EMBODIMENT

Figure 4:
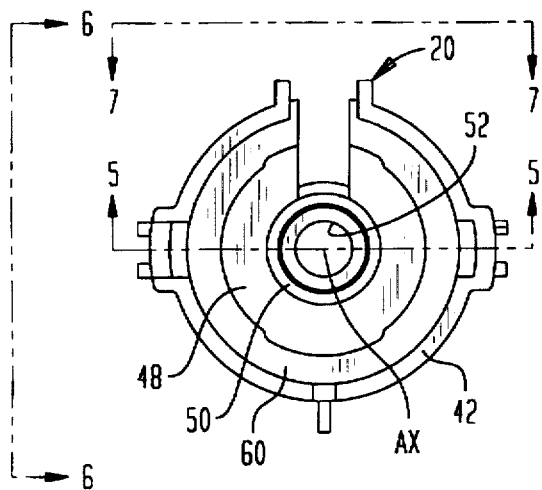
FIG. 4 is a top plan view of the mounting by itself.

FIG. 1 shows an automotive emission control valve 18 removably secured in a mounting 20 by a retaining clip 22. Valve 18 is illustratively disclosed as a balanced vapor purge valve for purging fuel vapors from confinement within an evaporative emission space of a fuel storage system to an intake manifold of an internal combustion engine.

Valve 18, further detail of which appears in FIGS. 2 and 3, comprises a body 24 having an inlet port 25 and an outlet port 26, the latter including a sonic nozzle structure 28. Body 24 is fabricated from suitable fuel-tolerant material and embodies outlet port 26 as a depending tube that is coaxial with a main longitudinal axis AX. At the internal end of outlet port 26, an annular seat surface 29 circumscribes a main flow passage extending internally of body 24 between the two ports. A solenoid assembly 30 is housed within body 24 coaxial with axis AX. An electric connector 32 for connecting solenoid assembly 30 with an external electric circuit (not shown) is present on the exterior of body 24.

A multi-part valve head assembly 34 is operatively coupled with solenoid assembly 30, and a force-balancing mechanism 36 is associated with valve head assembly 34. FIG. 3 shows a spring 37 biasing valve head assembly 34 to seal against seat surface 29 and thereby close the internal passage between the two ports when no electric current is being delivered to solenoid assembly 30. When valve 18 is closed, valve head assembly 34 is force-balanced by communicating whatever pressure is present at outlet port 26 (positive, negative, or nil) to a chamber space 38 via through-holes in valve head assembly 34. The communicated pressure acts on valve head assembly 34 via force-balancing mechanism 36 in a sense along axis AX that is opposite the sense of whatever force is acting directly on the seated area of valve head assembly 34 due to pressure at outlet port 26.

The delivery of an electric current representing a purge control signal to solenoid assembly 30 via connector 32 creates force in the direction of displacing valve head assembly 34 away from seat surface 29. As the current flow increases, so does the force. This force is countered by the increasing compression of spring 37. The extent to which valve head assembly 34 is displaced away from seat surface 29 is correlated with the current flow.

Because of force-balancing provided by mechanism 36 and the sonic flow provided by sonic nozzle structure 28, valve 18 is made essentially insensitive to varying manifold vacuum at outlet port 26 over the valve's operating range. In an operative purge control system, intake manifold vacuum is delivered through outlet port 26 and will act on the area circumscribed by the seating of valve head assembly 34 on seat surface 29. Absent force-balancing, varying manifold vacuum would vary the force required to open valve 18 and hence cause variation in electric current required to open the valve. Force-balancing de-sensitizes valve operation, initial valve opening in particular, to varying manifold vacuum. Once valve 18 has opened beyond an initial unseating transition, sonic nozzle structure 28 becomes effective as a true sonic nozzle (assuming sufficient pressure differential between inlet and outlet ports) providing sonic purge flow and being essentially insensitive to varying manifold vacuum. Further detail of valve 18 may be found in the above-referenced Non-provisional U.S. patent application Ser. No. 08/918,071.

Figure 6:
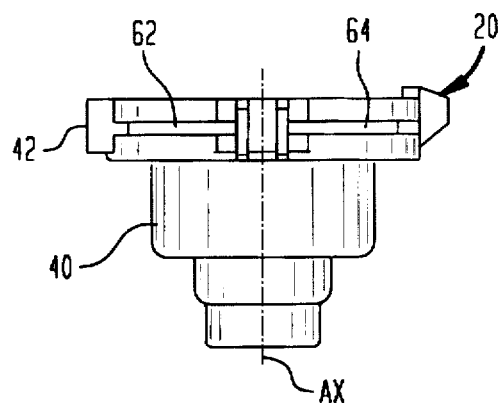
FIG. 6 is a left side elevation view in the direction of arrows 6—6 in FIG. 4.
Figure 5:
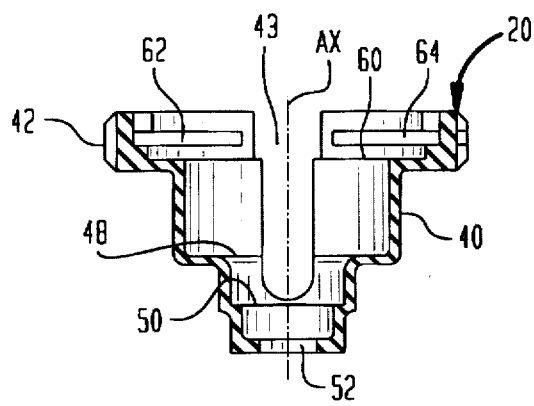
FIG. 5 is a transverse cross section view in the direction of arrows 5—5 in FIG. 4.
Figure 7:
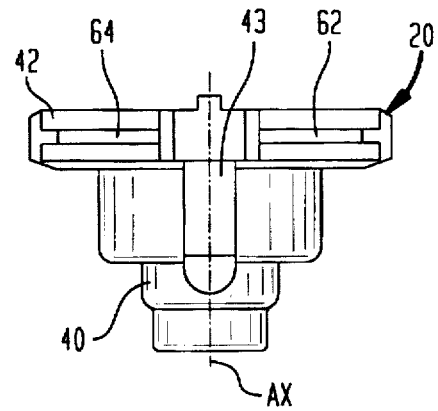
FIG. 7 is a rear elevation view in the direction of arrows 7—7 in FIG. 4.

Mounting 20 is illustratively disclosed by FIGS. 2 and 4-7 as a generally cylindrical walled formation in a plastic intake manifold of an internal combustion engine. The full manifold is not expressly shown in the drawings. The formation may be created in a manifold wall during the process of forming the manifold. Mounting 20 comprises a walled receptacle that provides a receptacle space for valve 20. Mounting 20 may be considered to comprise a lower wall 40 in the form of an integral multi-shouldered depression of the manifold wall, bounding by an upright upper wall 42. An axial slot 43 that has an entrance at the rim of upper wall 42 extends to a depth that allows port 25 to travel through the slot during assembly of valve 18 into mounting 20.

Assembly of valve 18 into the receptacle space provided by mounting 20 is performed by initially inserting the end of the valve which contains outlet port 26 into the open end of the receptacle space bounded by upper wall 42, and then advancing the valve to more fully insert it into the receptacle space. In the fully inserted position of valve 18, shoulders 44, 46 of valve body 24 are in intimate juxtaposition to respective shoulders 48, 50 of lower wall 40, inlet port 25 protrudes through slot 43 at the end of the slot opposite the slot's entrance end, and outlet port 26 protrudes through a circular hole 52 at the center of lower wall 40. Also, a circular lip 54 of a lip seal member 56 whose body is disposed around outlet port 26 seals against a surface of lower wall 40 to create a gas-tight seal of the tubular side wall of outlet port 26 to the receptacle wall proximate hole 52.

Around its outside, body 24 comprises a radially outwardly directed circular flange 58 that is coaxial with, and perpendicular to, axis AX. When valve 18 has been inserted to the fully installed position, flange 58 is in juxtaposition to a further shoulder 60 of mounting 20 at the junction of lower wall 40 and upper wall 42. Diametrically opposite portions of wall 42 contain respective slots 62, 64. Each slot 62, 64 is discrete from the other, having a uniform axial dimension, extending radially through wall 42, and having somewhat less than a semi-circular extent about axis AX in a respective semi-circumference of wall 42. With valve 18 in its fully installed position, slots 62, 64 are disposed axially just beyond flange 58 relative to shoulder 60. This allows retaining clip 22 to be placed in operative association with valve 18 and mounting 20 to retain the valve in the mounting.

Detail of retaining clip 22 appears in FIGS. 2 and 8–11. Clip 22 is a one-piece part, preferably fabricated by applying conventional metal-forming methods to suitable metal strip stock of generally uniform thickness. The preferred fabrication yields a one-piece part of homogenous metallic composition throughout. Clip 22 comprises a flat fork formation 66 adapted for insertion into slots 62, 64. Formation 66 may be considered to comprise two flat tines 66a, 66b that are mirror images of each other about an imaginary plane PL that bisects the clip. These two tines merge at plane PL. In that same vicinity, clip 22 comprises an integral locking tab formation 68 that joins with fork formation 66 via a reverse bend formation 69. The latter formation is a reverse curve profiled to a generally semi-circular shape.

Locking tab formation 68 comprises a flat locking tab 68a which is disposed generally parallel with, but spaced axially from, the plane of fork formation 66. A lead 68b extends for a short distance from an end of locking tab 68a opposite reverse bend 69. Locking tab 68a is generally rectangular in plan and contains a rectangular through-hole 68c.

Referring back to FIGS. 1 and 2, it can be seen that a portion of wall 42 that is circumferentially intermediate slots 62 and 64 contains a cooperating integral catch formation 70 for interaction with locking tab formation 68 to lock retaining clip 22 in place after the latter has been associated with mounting 20 to capture valve 18 in the receptacle space. Catch formation 70 comprises a somewhat trapezoidal-shaped tab 70a projecting radially outwardly on the exterior of the radially outer surface of wall 42 midway between slots 62 and 64. Formation 70 also comprises a short rectangular post 70b disposed on the rim of upper wall 42. Tab 70a has a ramp 70c leading to the plateau provided by post 70b.

Clip 22 is installed in the following fashion after valve 18 has been fully installed in mounting 20. The free ends of tines 66a, 66b are introduced into slots 62, 64, proximate respective sides of formation 70, in the manner suggested by FIG. 2. Continued insertion of the clip causes the tines to pass through, and emerge from, the slots in overlying relation to diametrically opposite portions of flange 58. The overall span of fork formation across its two tines is slightly less than the inside diameter of wall 42 so that as the tines are increasingly inserted, the clip's motion is guided in essentially a straight line. As clip insertion nears completion, lead 68b abuts ramp 70c and the free ends of tines 66a, 66b re-enter slots 62, 64 at locations across from the locations where they first entered the slots. Because length of each tine now spans a segment of wall 42 and is also axially captured by wall 42 at two locations along the tine's length, fork formation 66 is axially captured on mounting 20; now, continued clip insertion results in lead 68b riding up ramp 70c, flexing locking tab 68a from perpendicularity with axis AX because of the resilient flexibility imparted by reverse bend 69. Once lead 68b has cleared formation 70, and through-hole 68c has attained registration with both post 70b and ramp 70c, clip 22 relaxes to allow locking tab 68a to abut the rim of wall 42, lodging post 70b and ramp 70c within through-hole 68c. This catching of locking tab formation 68 creates an interference to attempted extraction of clip 22, thereby releasably locking 22 clip in installed position on mounting 20 and securing valve 18 in its installed position in the mounting.

Whenever valve 18 is to be removed from mounting 20, clip 22 is released from catch formation 70. This is done by flexing tab formation 68 (either manually or by a tool) to move locking tab 68a out of interference with formation 70 thereby unlocking the clip, which is then extracted from mounting 20 along a direction opposite that along which it was inserted into mounting 20. Once clip 22 has been removed, valve 18 can be pulled out of mounting 20 along axis AX.

From this disclosure the reader can appreciate that the invention provides suitable retention of an emission control device in a mounting, especially retention of an emission control valve on an internal combustion engine manifold. Clip 22 can be conveniently installed in and removed from mounting 20. When installed, clip 22 is self-locking to mounting 20. Clip 22 is also well suited for fabrication by known mass-production manufacturing techniques.

While slot 43 can advantageously constrain potential rotation of valve 18 within mounting 20 about axis AX due to its relationship to inlet port 25 which projects away from body 24 radially of axis AX, it should be appreciated that in any particular design, suitable clearance should be provided external to the slot to allow a hose (not shown in the drawings) to be fitted onto the nipple end of inlet port 25.

While the inventive principles may be practiced for various emission control valves, they are especially well suited for the example disclosed where intake manifold vacuum is applied to a valve outlet port that passes through a hole in a manifold. The body of seal member 56 is retained on the valve by a circular undercut 74 to which the seal member is fitted. The sealing force of lip 54 against the receptacle wall tends to be aided by the vacuum force due to the lip's generally frustoconical shape that tapers inwardly toward hole 52. A further advantage of lip 54 is its ability to seal satisfactorily to the receptacle wall over a larger range of manufacturing tolerances than might be the case for other types of seals.

While a presently preferred embodiment of the invention has been illustrated and described, it should be appreciated that principles are applicable to other embodiments that fall within the scope of the following claims.

What is claimed is:

1. A method of mounting an emission control device on a component of an internal combustion engine powered automotive vehicle, the method comprising:

providing an emission control device for controlling the passage of a fluid associated with operation of an internal combustion engine through the device, the device comprising a body having an imaginary axis and a flange that extends radially and circumferentially on the body;

providing a component of an automotive vehicle with a mounting for the device, the mounting comprising a catch and a receptacle defining a receptacle space within which at least a portion of the body of the device is to be disposed;

providing a retaining clip for engaging the mounting to retain the device in the mounting, the clip comprising a capturing formation for coacting with the receptacle to axially capture the body of the device in the receptacle space and a locking formation for releasably locking the clip with the catch;

providing the receptacle with a circumferentially extending wall having a slot that extends radially through the wall and circumferentially about the axis;

disposing at least a portion of the body of the device in the receptacle space;

associating the retaining clip with the mounting by passing the capturing formation into, through, and out of the slot, thence across the receptacle space in overlapping relation to the flange, and thence into the slot; and releasably locking the clip to the catch to prevent disengagement of the clip from the mounting, and attendant removal of the capturing formation out of capturing relation with the body of the device, unless the locking formation is released from locking with the catch.

2. A method as set forth in claim 1 in which the capturing formation is formed to comprise a fork containing plural tines, the slot to comprise plural discrete slots each extending radially through the wall and circumferentially about the axis in a respective circumferential span of the wall, and in which the associating step comprises passing each tine into, through, and out of a respective discrete slot, thence passing the tines across the receptacle space in overlapping relation to respective portions of the flange, and thence passing the tines into the respective discrete slots.

3. A method as set forth in claim 1 in which the clip is fabricated by forming metal strip stock of generally uniform thickness into a one-piece part of homogenous metallic composition throughout.

4. A method as set forth in claim 3 in which the clip is fabricated to comprise an intermediate formation joining the capturing and locking formations.

5. A method as set forth in claim 4 in which the capturing formation is formed to comprise a fork containing plural flat tines, the slot to comprise plural discrete slots each extending radially through the wall and circumferentially about the axis in a respective circumferential span of the wall, and in which the associating step comprises passing each tine into, through, and out of a respective discrete slot, thence passing the tines across the receptacle space in overlapping relation to respective portions of the flange, and thence passing the tines into the respective discrete slots.

6. A method as set forth in claim 5 in which the intermediate formation is formed to comprise a reverse bend, the catch to comprise a formation on the circumferentially extending wall, the locking formation to comprise a locking tab that extends from the reverse bend in the same direction as the flat tines, and the locking tab to comprise a through-hole that allows the locking tab to lock onto the catch formation, and the associating step includes locking the locking tab onto the catch formation as the tines pass into the respective discrete slots after having passed across the receptacle space in overlapping relation to the respective portions of the flange.

7. A method as set forth in claim 6 in which the locking tab is formed to be flat, and the locking formation to include a flat lead extending at an obtuse angle from the flat locking tab opposite the reverse bend, and the associating step includes abutting the flat lead with the locking tab to flex the locking tab.

8. A method as set forth in claim 7 in which the reverse bend is formed to comprise a generally semi-circular curved bend.

9. A method as set forth in claim 7 in which the catch formation is formed to comprise a ramp leading to a post that is disposed on a rim of the circumferentially extending wall, and the locking tab though-hole is formed to allow the locking tab to lock over both the post and the ramp.

10. A method as set forth in claim 1 in which the emission control device comprises a purge valve for purging fuel vapor to an engine intake manifold, the body of the device comprises an outlet port, and the mounting is contained in a wall of an engine intake manifold and comprises a hole through which the outlet port is adapted to passes, and including the step of disposing a seal around the outlet port and causing the seal to seal between the outlet port and the receptacle proximate the hole when a portion of the body is disposed in the receptacle space.

11. A method of retaining an emission control valve in a mounting on a component of an internal combustion engine powered automotive vehicle, the valve comprising a body having an imaginary axis, a flange that extends radially and circumferentially on the body, and ports for conveying gases associated with operation of an internal combustion engine into and out of the body, the mounting comprising a receptacle defining a receptacle space within which at least a portion of the body of the valve can be disposed, the receptacle comprises a generally circumferentially extending wall having a slot that extends radially through the wall and circumferentially about the axis, the method comprising:

providing a retaining clip for engaging the mounting to retain the valve in the mounting, the clip comprising a capturing formation for coacting with the receptacle to axially capture the body of the valve in the receptacle space; and associating the clip with the receptacle by passing the capturing formation into, through, and out of the slot, thence across the receptacle space in overlapping relation to the flange, and thence into the slot, and releasably locking the clip to one of the valve and the mounting to prevent the capturing formation from being extracted from the slot unless the clip is released from locking with the one of the valve and the mounting.

12. A method as set forth in claim 11 in which the step of releasably locking the clip to one of the valve and the mounting comprises releasably locking a locking formation of the clip with a catch formation of the mounting.

13. A method as set forth in claim 11 in which the slot comprises plural discrete slots each extending radially through the wall and circumferentially about the axis in a respective circumferential span of the wall, the capturing formation is formed to comprise a fork containing plural tines, and the associating step comprises passing each tine into, through, and out of a respective discrete slot, thence passing the tines across the receptacle space in overlapping relation to respective portions of the flange, and thence passing the tines into the respective discrete slots.

14. A method as set forth in claim 11 in which the mounting is contained in a wall of a non-metallic engine intake manifold and comprises a hole through which one port of the valve passes, and including the step of disposing a seal around the one port and causing the seal to seal between the one port and the receptacle around the hole when a portion of the body is disposed in the receptacle space.

15. A method as set forth in claim 14 in which seal comprises a lip, and including the step of flexing the lip against the wall of the receptacle around the hole.

16. A clip for use in retaining an emission control device in a receptacle comprising:

metal strip stock comprising a flat capturing formation having thickness of the strip stock disposed in an axial direction, a locking formation having thickness of the strip stock disposed in a direction that is non-perpendicular to the axial direction, and an intermediate formation joining the flat capturing formation and the locking formation to support the latter formation for resilient flexing motion relative to the former formation.

17. A clip as set forth in claim 16 in which the flat capturing formation comprises a flat fork having plural tines, the intermediate formation comprises a semi-circular curved formation of the strip stock, and the locking formation comprises a locking tab having a through-hole extending through the thickness of the strip stock.

18. A clip as set forth in claim 16 in which the clip comprises a homogeneous metallic composition throughout.

19. A clip as set forth in claim 16 in which the capturing formation comprises flat tines, the locking formation comprises a locking tab, and the intermediate formation comprises a generally semicircular curved bend formation integrally joining the locking tab and the capturing formation.

20. A clip set forth in claim 19 in which the locking tab extends from the curved bend formation in the same direction as the tines, and the locking tab comprises a through-hole.

\* \* \* \* \*